United States Patent [19]
Vandenberghe et al.

[11] Patent Number: 5,713,340
[45] Date of Patent: Feb. 3, 1998

[54] SYSTEM FOR FUELING AN INTERNAL COMBUSTION ENGINE WITH LOW AND HIGH PRESSURE GASEOUS FUEL

[75] Inventors: Terry M. Vandenberghe, La Rochelle, France; Gary L. Hunter, Columbus, Ind.; Patrick Pierz, Naperville, Ill.

[73] Assignee: Cummins Engine Company, Inc., Columbus, Ind.

[21] Appl. No.: 662,076

[22] Filed: Jun. 12, 1996

[51] Int. Cl.⁶ .................................................. F02D 41/00
[52] U.S. Cl. ............................................................ 123/682
[58] Field of Search ............................ 123/682, 527, 123/528, 431, 179.16, 685, 304, 525, 492, 419, 478, 681; 251/129.07

[56] References Cited

U.S. PATENT DOCUMENTS

| | | | |
|---|---|---|---|
| 4,574,763 | 3/1986 | Hallberg | 123/527 |
| 4,594,990 | 6/1986 | Batchelor | 123/527 |
| 4,614,168 | 9/1986 | Batchelor | 123/27 |
| 4,638,777 | 1/1987 | Fanner et al. | 123/277 |
| 4,638,783 | 1/1987 | Snyder | 123/527 |
| 4,641,625 | 2/1987 | Smith | 123/575 |
| 5,127,383 | 7/1992 | Wild | 123/492 |
| 5,172,676 | 12/1992 | Imamura | 123/682 |
| 5,351,656 | 10/1994 | Teramoto et al. | 123/3 |
| 5,373,700 | 12/1994 | McIntosh | 62/48.1 |
| 5,479,906 | 1/1996 | Collie | 123/525 |
| 5,483,943 | 1/1996 | Peters | 123/527 |
| 5,501,200 | 3/1996 | Bogartz | 123/527 |
| 5,533,492 | 7/1996 | Willey et al. | 123/681 |
| 5,553,593 | 9/1996 | Schnaibel et al. | 123/682 |
| 5,584,467 | 12/1996 | Harnett et al. | 251/129.07 |
| 5,598,825 | 2/1997 | Neumann | 123/478 |
| 5,615,655 | 4/1997 | Shimizu | 123/419 |

*Primary Examiner*—Raymond A. Nelli
*Attorney, Agent, or Firm*—Woodard, Emhardt, Naughton, Moriarty & McNett

[57] ABSTRACT

A hybrid gaseous fueling system having a low pressure supply and a high pressure supply is disclosed. This system provides the advantages of fueling with a low pressure charge during steady state operation and also provides a way to more rapidly smooth engine transients resulting from changes in engine operating characteristics such as speed or load by modulating high pressure fueling of the engine. Furthermore, air/fuel ratio control may be readily integrated into this system. In addition, start-up of the engine is performed using more fuel from the high pressure supply than the low pressure supply up to a predetermined level of engine operation. At that level and beyond, low pressure fueling is greater than high pressure fueling.

37 Claims, 6 Drawing Sheets

SYSTEM FOR FUELING AN INTERNAL COMBUSTION ENGINE WITH LOW AND HIGH PRESSURE GASEOUS FUEL

BACKGROUND OF THE INVENTION

A. Field of the Invention

The present invention relates generally to a fuel system for internal combustion engines and, more particularly, to a system for supplying high and low pressure gaseous fuel to an internal combustion engine.

B. Description of the Prior Art

Many existing systems employ gaseous fueled internal combustion engines. Generally, gaseous fueled engines are more "environmentally friendly" than gasoline fueled engines. As a result, gaseous fueled engines are often found in ground transportation vehicles and various other systems. As used herein, a "gaseous fuel" means a fuel which is in the gaseous state at standard temperature and pressure. A few examples of gaseous fuels used with internal combustion engines are: compressed natural gas, liquid natural gas, and liquid petroleum gas.

In order to obtain optimum engine performance, gaseous fueled engines typically monitor the mixture of air and fuel of a charge supplied to the engine for combustion. As used herein, "charge" means a combustable mixture of fuel and air provided to an engine. Air/fuel ratio of a charge is often a primary feedback parameter in gaseous fueled engine control systems because it can be easily adjusted to improve steady state engine performance. For example, air/fuel ratio control generally provides better fuel economy and lowers harmful exhaust emissions.

Existing systems typically regulate the flow of the air/fuel mixture into the engine to adjust power output via a valve associated with a control throttle. One problem with these existing systems is an inability to rapidly respond to changing demands for fuel. Generally, these demands result from a change in engine speed or load and create an engine transient condition which is not readily smoothed by conventional gaseous fueling systems. As a result, some systems typically increase the pressure of the air/fuel mixture to provide a more rapid response capability. However, such systems usually require a correspondingly larger compressor which may adversely impact overall efficiency of the internal combustion engine system.

Consequently, a need still remains for a gaseous fueling system with the capability to more rapidly respond to transient fueling conditions and yet preserve the advantages of low pressure fueling during steady state operation. Furthermore, this new system preferably accommodates air/fuel ratio control.

SUMMARY OF THE INVENTION

One aspect of the present invention is a gaseous fueling system having a low pressure fuel source and a high pressure fuel source. The timing and amount of fuel from each of the low and high pressure sources may be controlled to improve fueling efficiency and responsiveness. The system may be integrated with an air/fuel ratio control system. One application for this system is fueling an engine which drives an electric power generator. Another application is to fuel engines which power various types of vehicles. Indeed, many systems utilizing a gaseous fueled internal combustion engine may be advantageously adapted to use this system.

Another aspect of the present invention is a gaseous fueled internal combustion engine system which includes an internal combustion engine defining a combustion chamber, a low pressure air/fuel supply coupled to the combustion chamber to provide a mixture of air and low pressure gaseous fuel for combustion, and a high pressure fuel source coupled to the chamber.

In addition, the low pressure air/fuel supply includes a first controllable valve for regulating flow of the mixture into the combustion chamber. The high pressure fuel source has a second controllable valve for regulating the flow of high pressure fuel. A sensor provides an engine performance signal corresponding to one of engine speed and engine load. A controller responsive to the sensor is coupled to the first and second controllable valves and provides corresponding low and high pressure fueling signals. The first controllable valve responds to the low pressure fueling signal to regulate flow of the mixture. The second controllable valve responds to the high pressure fueling signal to regulate high pressure gaseous fuel flow. The second controllable valve may be a controllable fuel injector responsive to an injector fueling signal from the controller.

In one form of the present invention, a low pressure fuel source and a high pressure fuel source are coupled to a combustion chamber by a fuel supply passage. The passage receives fuel from the low pressure fuel source and high pressure fuel source for supply to the combustion chamber. Examples of such a passage include, but are not limited to an intake port, intake manifold, and charge flow pathway.

A further aspect of the present invention includes: (1) starting an engine with more fuel from a high pressure fuel source than a low pressure fuel source, (2) sensing an engine operating characteristic, the operating characteristic being engine speed or load, and (3) supplying more fuel to the chamber from the low pressure fuel source than the high pressure fuel source when the engine operating characteristic exceeds a predetermined level. In a variation of this feature, start-up fueling is provided at least in part from a high pressure storage vessel associated with the high pressure fuel source. Once the engine has reached a predetermined level of operation, this vessel may be replenished by diverting a portion of the high pressure fuel into it for the next engine start-up. Also, this vessel may supplement the high pressure fuel source to handle severe transient conditions.

Still another aspect of the fuel system of the present invention is controlling the ratio of fueling between high and low pressure fuel sources so that the bulk of the fuel is supplied by the low pressure source during steady state operation. This feature utilizes the high pressure source to rapidly fuel the engine in response to transients detected from a sensed engine characteristic such as speed or load. Generally, this configuration avoids the need to resort to a larger and often more inefficient fuel compressor in order to improve responsiveness to engine transients. Also, the risk of stratified charge within a combustion chamber is typically reduced by keeping the amount of high pressure fueling low relative to total fueling.

Accordingly, one object of the present invention is to provide a gaseous fuel system which provides a more rapid and controllable response to changing fueling demands.

Other objects are to accommodate air/fuel ratio control, provide improved engine start-up performance, and enhance overall gaseous fueled engine system efficiency.

Further objects and features of the present invention will be apparent from the drawings and discussion provided herein.

DESCRIPTION OF THE PREFERRED EMBODIMENTS

Figure 1:
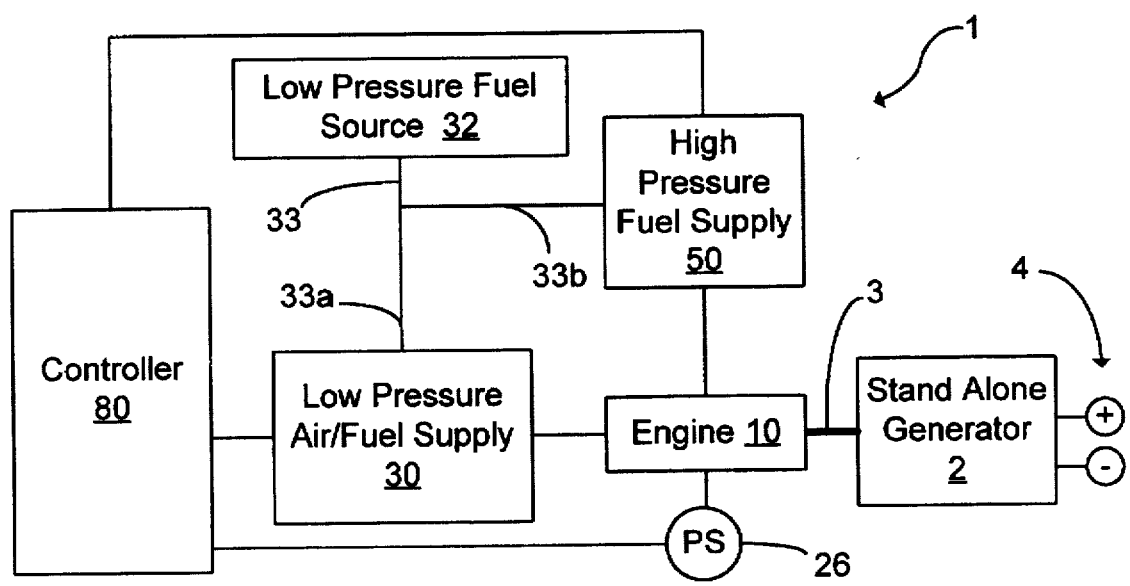
FIG. 1 is a diagrammatic view illustrating a preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, any alterations and further modifications in the illustrated device, or further applications of the principles of the invention as illustrated therein being contemplated as would normally occur to one skilled in the art to which the invention relates.

Referring to FIG. 1, an internal combustion system 1 of one preferred embodiment of the present invention is shown. System 1 includes an engine 10 coupled to a generator 2 by mechanical linkage 3. Engine 10 drives generator 2 to produce electric power. Generator 2 is of a stand alone configuration such that it operates independent of a power grid. In one embodiment, generator 2 supplies alternating current and voltage via terminals 4 to electrically power a device connected thereto (not shown). Notably, to effectively power such a device, generator 2 should provide power at a relatively constant frequency. This frequency corresponds to the rotational speed of generator 2. In turn the rotational speed of generator 2 corresponds to the rotational speed of engine 10 driving generator 2. Thus, it is preferred that the speed of engine 10 be controlled to provide for reliable operation of system 1.

Engine 10 is fueled with a gaseous fuel from low pressure air/fuel supply 30 and high pressure fuel supply 50. Low pressure air/fuel supply 30 and high pressure fuel supply 50 receive low pressure fuel from low pressure fuel source 32 via low pressure line 33. Controller 80 is coupled to low pressure air/fuel supply 30 and high pressure fuel supply 50 to control fueling from each supply, respectively. Engine position sensor 26 is coupled to controller 80 to provide signal PS. Signal PS is indicative of the position of the engine 10 cam shaft (not shown) by use of a variable reluctance sensor and fixed teeth located on the engine cam shaft gear. In alternative embodiments, other conventional types of speed sensor 26 may be used. Controller 80 may use the frequency of signal PS to determine rotational speed of engine 10 and control engine speed accordingly by adjusting fuel flow from low pressure air/fuel supply 30 and high pressure fuel supply 50. Because the speed of generator 2 is dependent upon speed of engine 10, controller 80 may regulate the speed of generator 2 in a corresponding fashion.

Figure 2:
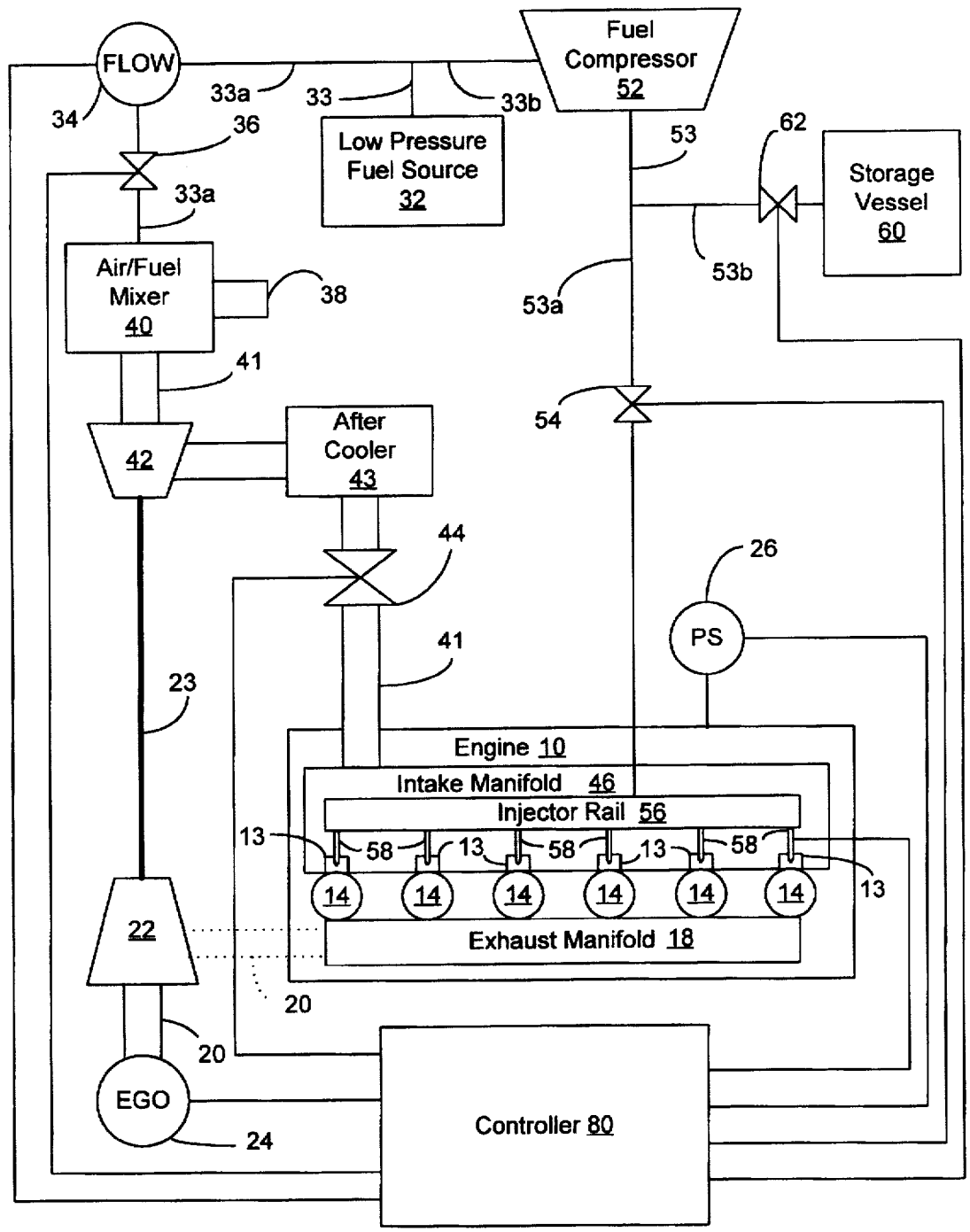
FIG. 2 is a diagrammatic view showing certain aspects of the embodiment of FIG. 1 in greater detail.

FIG. 2 further illustrates certain aspects of the gaseous fuel system shown in FIG. 1. Fuel source 32 is again shown which may be a tank or supply line. Fuel source 32 is coupled to low pressure supply line 33 which branches into lines 33a and 33b. Fuel sensor 34 is coupled to controller 80 to provide signal FLOW. Signal FLOW is indicative of the gas mass flow rate of fuel through line 33a. The flow of fuel along line 33a is regulated by controllable valve 36 coupled to controller 80.

Fuel from line 33a mixes with air from intake 38 in air/fuel mixer 40. The resulting mixture of air and gaseous fuel proceeds along pathway 41. Low pressure compressor 42 biases flow of the gaseous fuel and air mixture along pathway 41. Next this mixture—a low pressure charge—proceeds through after cooler 43 which is of a conventional type. Flow of the low pressure charge along pathway 41 is regulated by throttle valve 44 which is controllably coupled to controller 80. Throttle valve 44 may be a controllable butterfly valve of a conventional type.

The regulated charge flows from throttle valve 44 to intake manifold 46. Intake manifold 46 provides the charge for combustion in engine 10.

For the FIG. 2 embodiment, items designated by reference numerals in the range of 34-44 generally correspond to components of the low pressure air/fuel supply 30 shown in FIG. 1. In other embodiments, fuel source 32, low pressure supply line 33, line 33a and line 33b may also be considered as elements of low pressure air/fuel supply 30.

FIG. 2 also depicts elements of high pressure fuel supply 50. Fuel compressor 52 increases pressure of gaseous fuel supplied along line 33b to provide a high pressure fuel source relative to the pressure of fuel in the low pressure air/fuel supply 30 or pressure of fuel in low pressure fuel source 32. Fuel compressor 52 supplies high pressure fuel to high pressure supply line 53 which branches into lines 53a and 53b. In a variation of this embodiment, fuel from high pressure supply line 53 is selectively returned to line 33 to regulate pressure generated by fuel compressor 52 (not shown).

The flow of high pressure fuel along high pressure supply line 53a is regulated by controllable valve 54 coupled to controller 80. Regulated high pressure fuel from controllable valve 54 is supplied to injector rail 56 within engine 10. High pressure fuel in injector rail 56 is selectively delivered for combustion in engine 10 by each of a number of controllable injectors 58. Controllable injectors 58 are of a conventional type and may be of the multi-port variety common to sequential port injection systems. Line 53b from high pressure supply line 53 is regulated by controllable valve 62 coupled to controller 80. Regulated high pressure fuel from valve 62 leads to storage vessel 60. By opening valve 62 and closing controllable valve 54, fuel from fuel compressor 62 may be stored in storage vessel 60 at high pressure. Also, by opening controllable valve 62 and controllable valve 54, fuel from storage vessel 60 may be supplied to injector rail 56 even when fuel compressor 52 is not in operation.

For the embodiment depicted in FIG. 2, items indicated by reference numerals in the range of 51-62 generally correspond to components of the high pressure fuel supply 50 depicted in FIG. 1. In other embodiments, the components for high pressure supply 50 may vary as would occur to those skilled in the art. Besides fuel compressor 52, other elements which may be regarded as a high pressure fuel source include high pressure supply lines 53, 53a, 53b; vessel 60; and the various elements of high pressure fuel supply 50 in combination. In alternative embodiments, a high pressure fuel source configured for use with the present invention may be completely independent from the low pressure fuel source 32, having a separate high pressure tank, pipeline, or other source of supply. In still other embodiments, low pressure fuel source 52 may vary as would occur to one skilled in the art.

Figure 3:
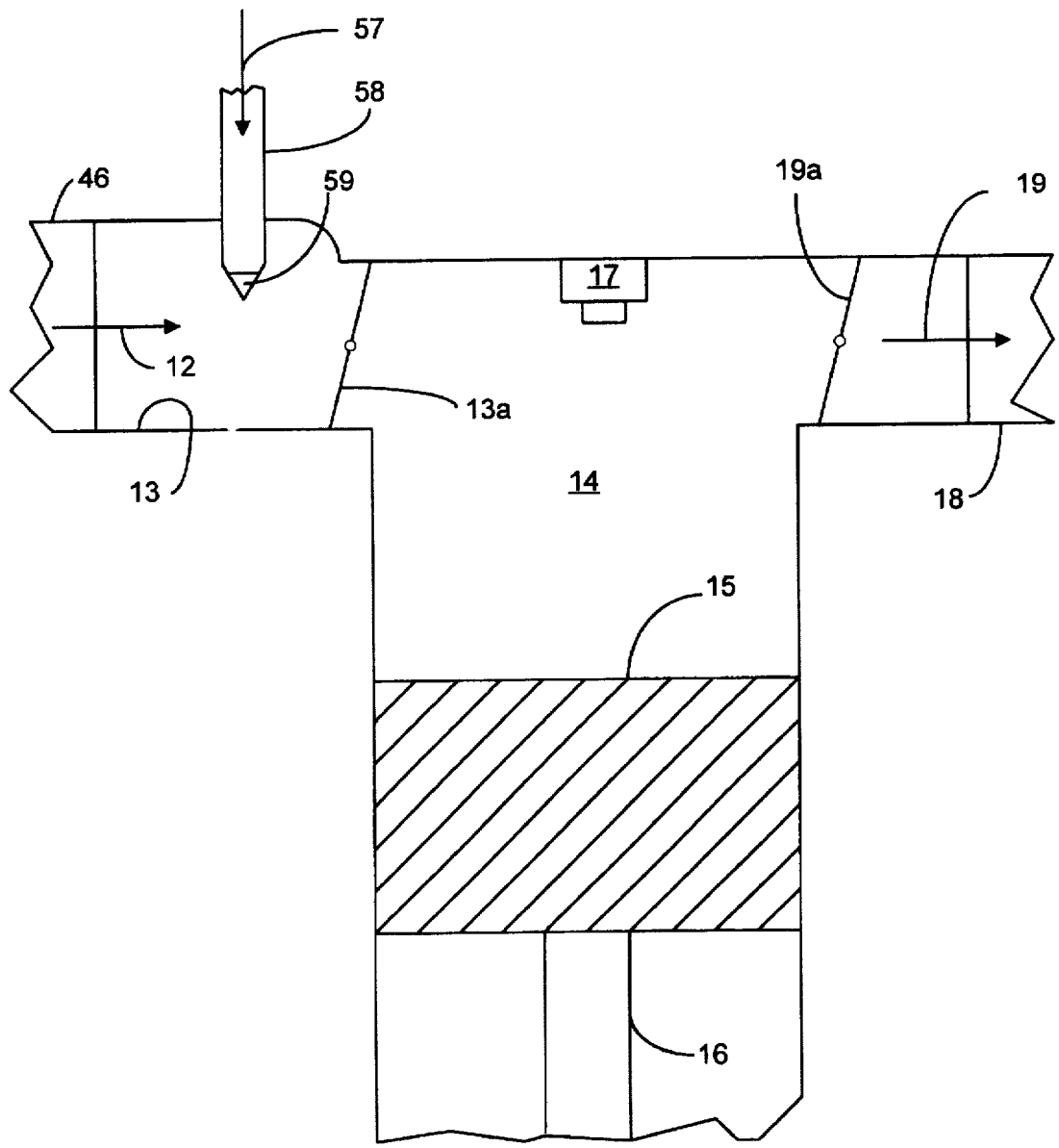
FIG. 3 is a diagrammatic view illustrating certain aspects of components shown in FIG. 2.

Engine 10 also includes a plurality of combustion chambers 14 each coupled to an intake port 13. Referring specifically to FIG. 3, one chamber 14 is shown in greater detail, it being understood that the other chambers 14 and intake ports 13 of FIG. 2 are similarly configured. Chamber 14 has reciprocating piston 15 coupled to a cam shaft (not shown) via rod 16. Chamber 14 is coupled to intake port 13 via valve 13a. Chamber 14 is fueled from intake port 13 when valve 13a is opened. Intake port 13 receives a charge from intake manifold 46 along a path represented by arrow 12.

Also, intake port 13 has a corresponding controllable injector 58. Controllable injector 58 has outlet 59 emptying into intake port 13. High pressure fuel enters intake port 13 through outlet 59 as represented by arrow 57. Referring additionally to FIG. 2, each controllable injector 58 is coupled to controller 80 to regulate high pressure fuel flow into each corresponding intake port 13. Coupling of only one controllable injector 58 is shown to enhance clarity of FIG. 2.

Fuel in combustion chamber 14 is ignited by ignition means 17. Although not shown for clarity, each combustion chamber 14 has an independent ignition means 17. Ignition means 17 may be controlled by controller 80 using a direct fire module (not shown), or alternatively, a conventional spark plug/distributor ignition system may be used. In still other embodiments, ignition means and related ignition control systems are employed as would occur to those skilled in the art.

Low pressure fuel and air from intake manifold 46 and high pressure fuel from controllable injector 58 intermix within intake port 13. The resulting mixture is supplied to combustion chamber 14 by opening valve 13a and ignited by ignition means 17 to supply energy to drive the corresponding pistons 15 of engine 10. A combusted charge is exhausted from combustion chamber 14 along arrow 19 to exhaust manifold 18 when exhaust valve 19a is opened. Exhaust exits engine 10 along pathway 20 and drives turbine 22. In turn, turbine 22 drives compressor 42 via mechanical coupling 23. A mechanical coupling (not shown) may also drive fuel compressor 52. In an alternative embodiment, a separate turbine (not shown) drives fuel compressor 52.

Combustion products along pathway 20 form an exhaust stream which is monitored by sensor 24. Sensor 24 is coupled to controller 80 to provide an EGO signal indicating oxygen level in the exhaust stream. Typically, the amount of oxygen in combustion products of a charge is indicative of the air/fuel ratio of that charge just prior to combustion. Because it is generally indicative of the air/fuel ratio of the charge combusted in engine 10, the EGO signal may be used as a feedback parameter to improve combustion efficiency and reduce harmful emissions in the exhaust stream.

Notably, pathway 41, intake manifold 46, and each intake port 13 define a fuel supply passage for each chamber 14. Preferably, high pressure fuel supply 50 is coupled to each intake port 13 by a corresponding injector 58 to provide selective control over the flow of high pressure fuel supplied to each chamber 14 for combustion. In alternative embodiments, high pressure fuel supply 50 may be connected at various other points along this passage after throttle valve 44 either with or without a connection to each intake port 13. In still other embodiments, a controllable fuel injector may not be used in conjunction with high pressure fueling.

Figure 4A:
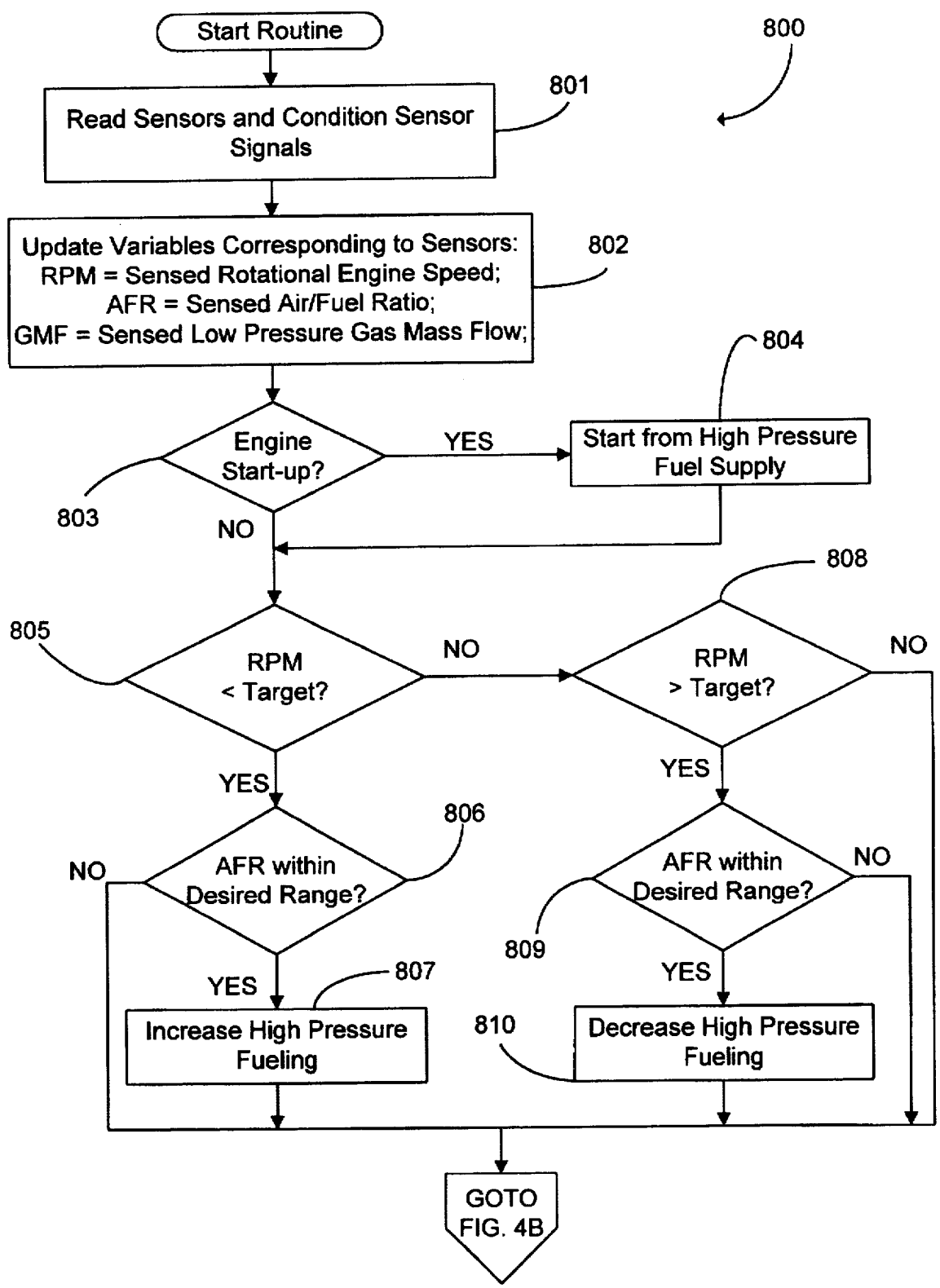
FIG. 4A is a flow chart illustrating a control system for use with the embodiment shown in FIGS. 1-3.
Figure 4B:
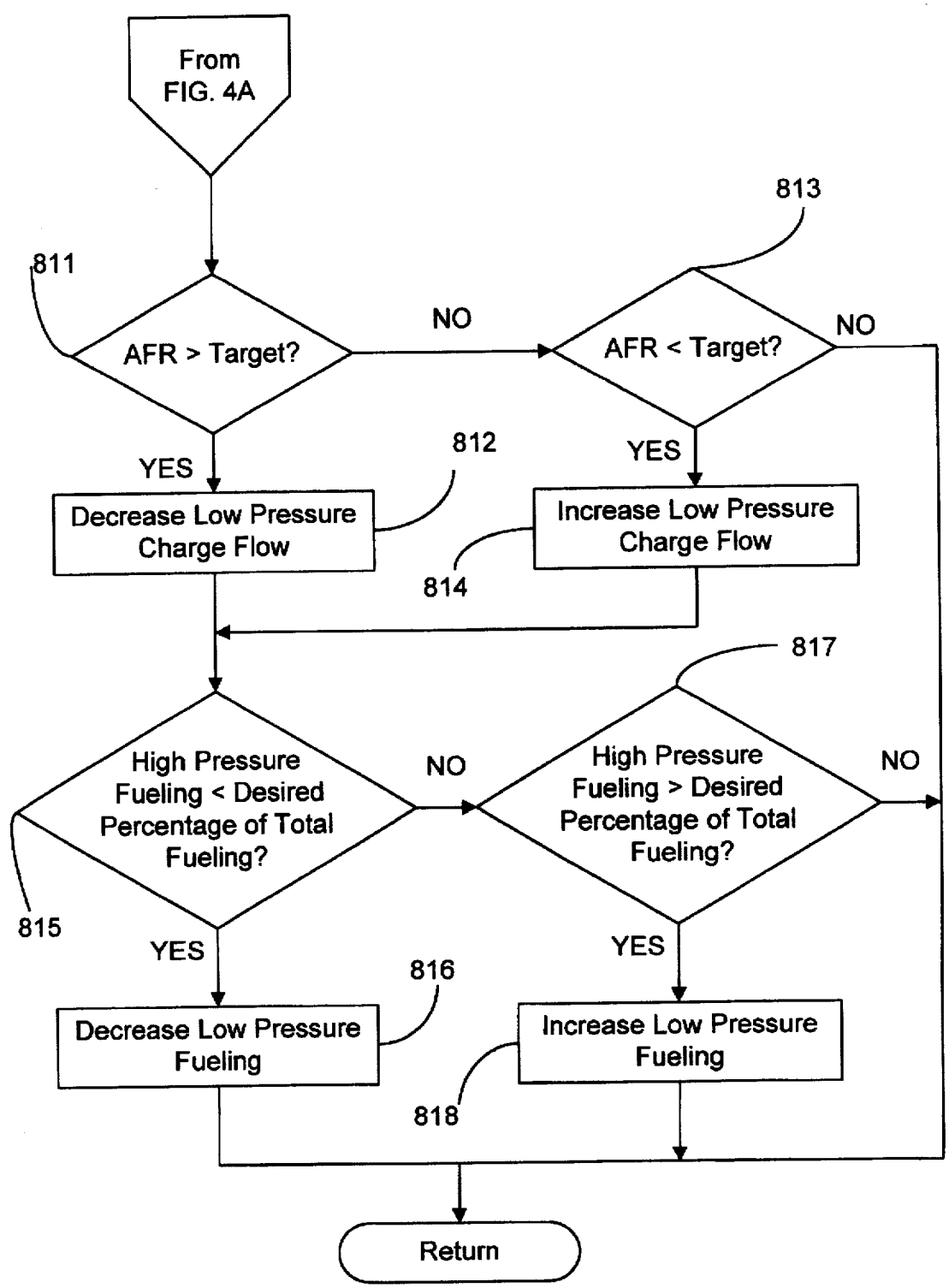
FIG. 4B is a continuation of the flow chart shown in FIG. 4A.

FIGS. 4A and 4B provide a flow chart of routine 800 for execution by a programmable version of controller 80 of the preferred embodiment depicted in FIGS. 1–3. FIG. 4A shows the start of routine 800. Routine 800 continues and concludes on FIG. 4B. In step 801 shown in FIG. 4A, sensors are read and the corresponding signals are conditioned as appropriate. Step 801 may include linearization of the sensor signals such as signal FLOW and signal EGO and also includes any required analog to digital conversion of those signals. Signal conditioning may include averaging various signals over a given period of time and other statistical treatments as would occur to those skilled in the art.

Variables corresponding to sensor signals are updated in step 802. Rotational engine speed, RPM, is updated as a function of signal PS from positional sensor 26. The air/fuel ratio, AFR, is updated as a function of signal EGO as conditioned in step 801. Similarly, gas mass flow, GMF, is updated as a function of signal FLOW.

In step 803 it is determined whether the engine 10 has been started. In one embodiment, the step 803 determination is based upon RPM. If a start-up condition is detected, then start-up fueling is provided from high pressure fuel supply 50 in step 804. Generally, high pressure fueling provides a faster and more reliable start-up than low pressure fueling. In one variation of this embodiment, the high pressure fuel is delivered from storage vessel 60. Pressurized fuel in storage vessel 60 may be made available to start engine 10 by opening controllable valve 54 and 62 even when high pressure fuel from fuel compressor 52 is not available. In alternative embodiments, high pressure start-up fuel may be obtained from fuel compressor 52 or a combination of fuel compressor 52 and storage vessel 60.

After engine 10 start-up, control flows to conditional 805. Conditional 805 tests whether engine speed meets a target level or is within a target range. If engine speed, RPM, is less than the target value, then air/fuel ratio, AFR, is checked to determine whether it is within a desired range in conditional 806. If AFR is within the proper range, high pressure fueling is increased in step 807 to provide for increased engine speed and thereby smooth the transient caused by the speed change.

Returning to conditional 805, if engine speed is not below target, then control flows to conditional 808. Conditional 808 determines determines whether engine speed is greater than the selected target. If the engine speed, RPM, does exceed the target value or is outside the target range, then AFR range is checked in conditional 809. If the AFR is within the desired range, then high pressure fueling is decreased in step 810 to slow the engine accordingly.

In alternative embodiments, it may be preferred to use a different engine performance parameter or engine operating characteristic than engine speed. For example, in one alternative embodiment, steps 805 and 808 check whether engine load meets a target value or target range. Similar to engine speed, transients in engine load are also addressed by an adjustment to high pressure fueling. In still other embodiments, engine load and engine speed may both be used as control parameters.

Once high pressure fueling or fuel flow is adjusted in either step 807 or 810, control flows to conditional 811 shown in FIG. 4B. Also control flows to conditional 811 if AFR is outside the desired range as determined in conditional 806 or conditional 809. Similarly, control flows to conditional 811 if RPM satisfies the target condition.

Referring to FIG. 4B, conditional 811 determines whether air/fuel ratio, AFR, is greater than a target value. If the AFR target is exceeded, then low pressure charge flow is decreased in step 812 to reduce the amount of air in intake port 13 for a given high pressure fuel flow. This richer charge is then supplied from intake port 13 to chamber 14 for combustion. If AFR does not exceed the target in condition 811, then control flows to conditional 813 which tests whether AFR is less than a target value. If AFR is less than the target, then low pressure charge flow is increased in step 814 to increase the relative amount of air in intake port 13 for a given high pressure fuel flow. This leaner charge is then supplied from intake port 13 to chamber 14 for combustion. If AFR is on target, routine 800 returns control to the calling routine. Preferably, adjustments to low pressure charge flow are made by adjusting throttle valve 44.

In an alternative embodiment, a controllable wastegate valve along pathway 41 (not shown) may be opened to adjust AFR by bleeding excess low pressure charge flowing from after cooler 43. Also, a wastegate may be used to adjust pressure in pathway 20 to change the speed of turbine 22 and compressor 42 via coupling 23. This change in compressor speed adjusts charge flow in pathway 41 to correct AFR. In other embodiments, a controllable airflow valve may be added to air intake 38 to accommodate AFR adjustments, air/fuel ratio is adjusted by changing the low pressure fuel flow into mixer 40 with controllable valve 36, or various control methods are combined as would occur to one skilled in the art. In a variation of these embodiments, signal FLOW is used to monitor low pressure fuel adjustments in conjunction with air/fuel ratio control. Notably, sensor 34 and associated signal FLOW may be used to provide a "limp home" capability should sensor 24 fail or the EGO signal otherwise become unavailable.

If AFR is adjusted in steps 812 or 814, conditional 815 is next encountered which determines whether high pressure fueling is less than a desired percentage of total fueling. If high pressure fueling does not constitute the desired percentage, then low pressure fueling is decreased in step 816 by adjusting valve 36, throttle valve 44, or both. If conditional 815 is not satisfied, then conditional 817 is encountered to test whether high pressure fueling exceeds a desired percentage of total fueling. If high pressure fueling does exceed the desired percentage, then low pressure fueling is increased in step 818. In a variation of this embodiment, conditionals 815 and 817 may alternatively test for compliance of a desired fueling ratio of high pressure fuel relative to total fueling. In other embodiments, high pressure fueling is determined relative to low pressure fueling. Once fueling is adjusted in either step 816 or step 818, control returns to the calling routine.

Preferably, control of system 1 includes conventional compensation methods with appropriate gain factors. In one embodiment, these gain factors should be configured so that RPM adjustments in steps 803-810 are relatively quicker than responses generated in other control loops of routine 800. Similarly, for this embodiment, the AFR control loop of steps 811-814 is preferably set for a relatively more sensitive response than the high pressure fueling percentage control loop of steps 815-818. Generally, this scheme assures that engine transience smoothing is given the highest priority, air/fuel ratio control is given an intermediate priority, and high pressure fueling percentage is given the lowest priority relative to routine 800.

Notably, transient speed conditions of engine 10 during start-up and operation may be addressed by adjusting fueling of the high pressure fuel system 50 in accordance with steps 803-810 of routine 800. The controllable injectors 58 of high pressure fueling supply 50 provide a way to rapidly respond and smooth speed transience. Also, high pressure fueling with a port injection system generally reduces the chance of intake manifold flashback.

On the other hand, predominately fueling from a low pressure air/fuel source 30 is often more efficient during steady state operation—especially when refined control over air/fuel ratio is desired. Moreover, by limiting the high pressure fuel flow capability to that typically required for expected transients, stratified charge problems are minimized. Thus, a balance between fueling from high pressure fuel supply 50 and an air/fuel supply with a low pressure source is preferred. Controlling the percentage of high pressure fuel flow to total fuel flow in steps 815-818 of routine 800 provides one way to achieve this goal.

For one preferred embodiment, fuel compressor 52 is sized to provide a high pressure fuel flow of about 30% of the total maximum expected fueling demand to smooth engine transiance. However, once steady state operation is achieved, it is preferred that the relative percentage of high pressure fueling to total fueling be maintained in a range of about 10-20% for this embodiment.

In a variation of this embodiment, high pressure fuel from storage vessel 60 is added to high pressure fuel from fuel compressor 52 to handle large transients requiring more high pressure fueling than fuel compressor 52 can supply alone. The preferred maximum high pressure fueling capability and preferred steady state high pressure fueling contribution is a combination of engine design goals and parameters such as speed change response time, engine emission standards, overall engine efficiency, specific fuel type, and relative pressures of low pressure fuel in air/fuel supply 30 and high pressure fuel from high pressure fuel supply 50.

In other embodiments, high pressure fueling may provide the dominant amount of fueling. Indeed, in one embodiment, it is envisioned that engine 10 be exclusively fueled from high pressure fueling supply 50 during start-up, with more high pressure fueling than low pressure fueling being used up to a certain performance level of engine 10. In a variation of this embodiment, the relative percentage of high pressure fueling gradually decreases from about 100% at start-up to about 15% during full power steady state operation. It should be noted that certain steps of routine 800 depicted in FIGS. 4A and 4B may be performed more or less often than others or otherwise varied as would occur to those skilled in the art. For example, in one alternative embodiment, the sensors are read and variables are updated in steps 801 and 802 more or less often than the performance of other steps in routine 800. In one embodiment, routine 800 is periodically executed on a fixed time interval basis. In other embodiments, routine 800 may be executed as an interrupt routine with or without other scheduled execution cycles.

Figure 5:
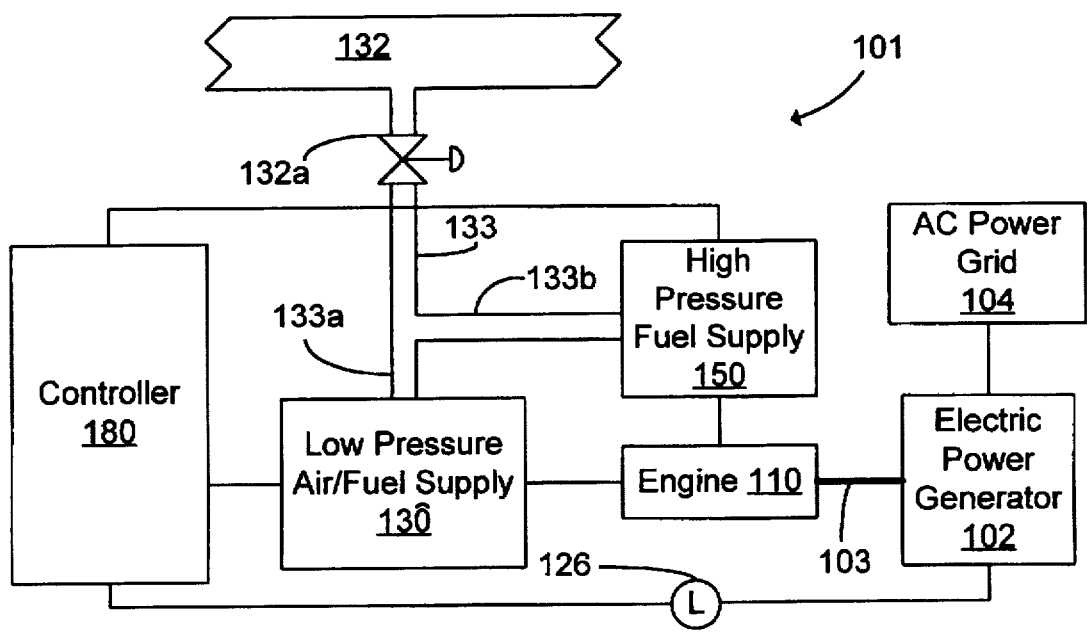
FIG. 5 is a diagrammatic view illustrating a second preferred embodiment of the present invention.

FIG. 5 depicts another preferred embodiment of internal combustion engine system 101 of the present invention. System 101 includes a power generator 102 for providing electric power to A.C. power grid 104. As opposed to generator 2 shown in FIG. 1, the speed of power generator 102 is held steady by the frequency of A.C. power grid 104. However, the power output of power grid generator 102 is typically variable. Usually, the target power output of a power grid generator is set by a throttle associated with generator 102, a remotely located control center, or both (not shown).

Engine 110 drives generator 102 via mechanical linkage 103. However, control of engine 110 is performed by monitoring the power output of generator 102. The power output of generator 102 corresponds to the load on engine 110 from driving generator 102. Specifically, sensor 126 is coupled to controller 180 to provide a signal L indicative of generator 102 power output. Sensor 126 may be a load sharing device, power meter, or a combination of voltage and current sensors monitoring the interface of electric power generator 102 to A.C. power grid 104. In one embodiment, sensor 126 represents a pair of voltage and current sensors on each of three terminals corresponding to a three phase output of generator 102 to A.C. power grid 104. Signal L is indicative of engine load caused by generator 102. A variable EL may be derived from signal L and substituted for RPM in steps 803–808 of routine 800 or otherwise added as an additional engine operating characteristic for a control routine executed by controller 180.

Engine 110 is fueled by low pressure air/fuel supply 130 and high pressure fuel supply 150 which are controlled by controller 180 similar to system 1. However, gaseous fuel is piped to system 101 by low pressure fuel supply pipe line 132. Conduit 133 branches from fuel supply pipeline 132 and has shut off valve 132a. Conduit 133 branches into supply conduits 133a and 133b to deliver low pressure gaseous fuel to low pressure air/fuel supply 130 and high pressure fuel supply 150, respectively. In one embodiment, fuel supply pipe line 132 is a conventional natural gas supply line. Pipeline fueling of engine 110 has the advantage of not needing a separate fuel tank to fuel system 101.

Figure 6:
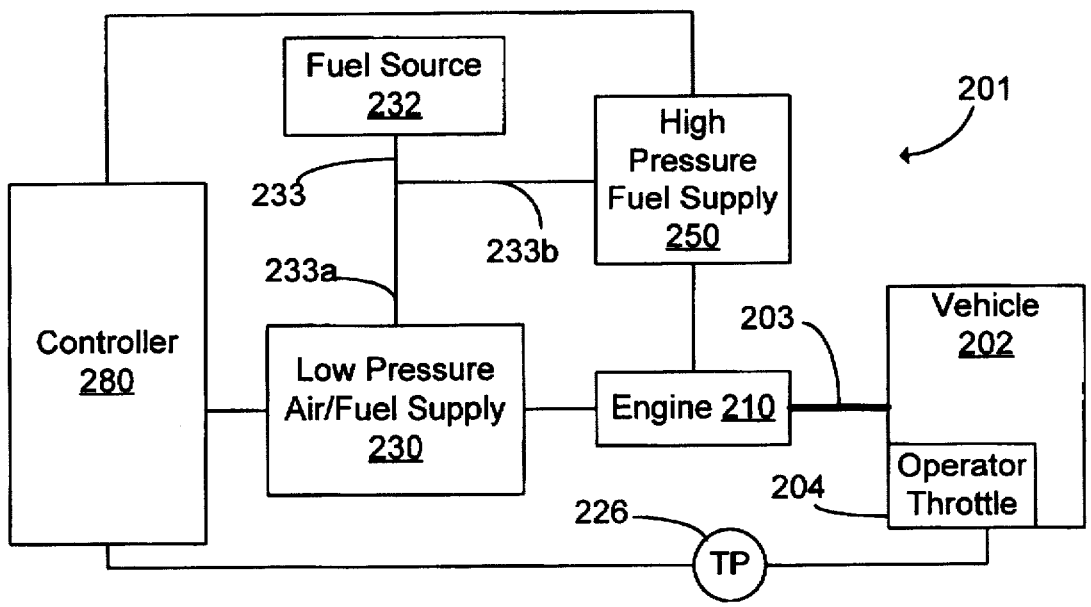
FIG. 6 is a diagrammatic view illustrating a third preferred embodiment of the present invention.

In FIG. 6, still another preferred embodiment of system 201 of the present invention is shown. In system 201, vehicle 202 is powered by engine 210 via mechanical linkage 203. System 201 has a low pressure fuel source 232 for providing fuel to low pressure air/fuel supply 230 and high pressure fuel supply 250 via fuel lines 233, 233a and 233b. Vehicle 202 includes throttle 204 controlled by the vehicle operator. Sensor 226 coupled to controller 280 provides signal TP corresponding to position of throttle 204. In a control system configured for execution by controller 280, signal TP may be used to provide an electronic throttle control in conjunction with an engine speed sensor such as shown in FIGS. 1 and 2.

In other embodiments of the present invention, various elements of the controllers 80, 180, 280; low pressure air/fuel supplies, 30, 130, 230; high pressure fuel supplies, 50, 150, 250; and routine 800 may be combined, substituted, and altered as would occur to those skilled in the art. Furthermore, controllers 80, 180, 280 may be an electronic circuit comprised of one or more components. Similarly, these controllers may be comprised of digital circuitry, analog circuitry, or both. Also, controllers 80, 180, 280 may be programmable, digital or analog processors, or a hybrid combination thereof. However, preferably controllers 80, 180, 280 are microprocessor based devices of a known construction.

Sensors 24, 26, 34, 126, 226 may provide a signal in either a digital or analog format to their respective controllers. Correspondingly, each controller is configured to condition and convert sensor signals to the appropriate format, as required. All sensors of systems 1, 101, 201 are of a known construction.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of fueling an internal combustion engine, the engine having a combustion chamber, a low pressure air/fuel supply coupled to the combustion chamber to provide a mixture of air and low pressure gaseous fuel, and a high pressure fuel supply with a controllable fuel injector coupled to the combustion chamber to provide high pressure gaseous fuel, comprising the steps of:

(1) sensing an engine operating characteristic, the operating characteristic being one of engine speed and engine load;

(2) fueling the combustion chamber from the low pressure air/fuel supply and the high pressure fuel supply; and (3) actuating the controllable fuel injector to regulate fuel flow in response to the sensed engine operating characteristic of step (1).

2. The method of claim 1, wherein step (2) includes simultaneously supplying fuel to the combustion chamber from the low pressure air/fuel supply and the high pressure fuel supply, and further comprising the steps of:

(4) determining a change in the engine operating characteristic sensed in step (1); and (5) actuating the controllable injector to adjust fueling from the high pressure fuel supply in response to the change determined in step (4).

3. The method of claim 1, wherein step (3) includes the steps of:

(3a) establishing a target range of high pressure fueling amount relative to total fueling of the combustion chamber; and (3b) adjusting fuel flow from the low pressure air/fuel supply in accordance with the target range established in step (3a).

4. The method of claim 3, wherein the target range is about 10% to 20%.

5. The method of claim 1, wherein step (3) includes:

(3a) establishing a steady state fueling ratio of high pressure fuel flow to total fuel flow;

(3b) establishing a target operating characteristic, the target operating characteristic being one of engine speed and engine load;

(3c) adjusting fuel flow from the high pressure fuel supply to achieve the target operating characteristic of step (3b);

(3d) adjusting fuel flow from the low pressure air/fuel supply in accordance with the steady state fueling ratio established in step (3a).

6. The method of claim 1, further comprising the steps of:

(4) starting the engine with more fuel from the high pressure fuel supply than the low pressure air/fuel supply; and (5) supplying more fuel to the combustion chamber from the low pressure air/fuel supply than the high pressure fuel supply when the engine operating characteristic sensed in step (1) exceeds a predetermined level.

7. The method of claim 6, wherein the engine includes an intake port coupling the low pressure air/fuel supply and controllable fuel injector to the combustion chamber, the engine has an exhaust stream for exhausting combusted products, and further comprising the steps of:

(6) sensing an air/fuel ratio from the exhaust stream;

(7) establishing a target air/fuel ratio for the engine;

(8) establishing a steady state fueling ratio of high pressure fuel flow to total fuel flow;

(9) supplying fuel to the intake port in accordance with the steady state fueling ratio established in step (8);

(10) determining engine transience as a function of the engine operating characteristic sensed in step (1); and

(11) adjusting fuel flow from the high pressure fuel supply to smooth engine transience determined in step (10).

8. An internal combustion engine system fueled by a gaseous fuel, comprising:

an internal combustion engine defining a combustion chamber;

a low pressure air/fuel supply coupled to said combustion chamber to provide a mixture of air and low pressure gaseous fuel and including a first controllable valve, said first controllable valve regulating flow of the mixture supplied to said combustion chamber;

a high pressure fuel supply coupled to said combustion chamber to provide high pressure gaseous fuel and including a controllable injector, said controllable injector regulating flow of high pressure gaseous fuel supplied to said combustion chamber;

a first sensor providing an engine performance signal corresponding to one of engine speed and engine load;

a controller responsive to said first sensor and coupled to said first controllable valve and said controllable injector, said controller being configured to provide an injector fueling signal and a valve fueling signal in accordance with said performance signal; and wherein said injector responds to said injector fueling signal to regulate high pressure gaseous fuel flow and said first controllable valve responds to said valve fueling signal to regulate flow of the mixture.

9. The system of claim 8, wherein said controller detects a change in said performance signal, and adjusts high pressure fueling in response to said change.

10. The system of claim 8, further comprising an electric power generator coupled to said engine, said generator being driven by said engine, and said performance signal corresponding to engine speed.

11. The system of claim 8, further comprising a second sensor providing an air/fuel ratio signal corresponding to air/fuel ratio of combusted products exhausted from said combustion chamber, said controller being responsive to said second sensor to adjust at least one of said first controllable valve and said controllable injector as a function of said air/fuel ratio signal.

12. The system of claim 8, wherein said low pressure air/fuel supply and said high pressure supply are coupled to said combustion chamber by an intake port.

13. The system of claim 8, wherein:

said low pressure air/fuel supply includes a low pressure fuel source with a second controllable valve regulating the flow of fuel from said low pressure fuel source into the mixture, a first compressor for pressurizing the mixture, and an intake manifold for distributing the mixture to said engine; and said high pressure fuel supply is coupled to said low pressure fuel source and includes a second compressor for increasing pressure of fuel received from said low pressure fuel source.

14. The system of claim 8, wherein:

said valve and injector fueling signals are configured to provide more high pressure fuel than low pressure fuel when the engine is started and more low pressure fuel than high pressure fuel when said engine performance signal exceeds a predetermined level;

said high pressure fuel supply includes a high pressure fuel line and a vessel for retaining fuel under high pressure;

said vessel is coupled to said high pressure fuel line by a second controllable valve;

said controller is coupled to said second controllable valve and is configured to provide a vessel fueling signal; and said vessel fueling signal actuates said second controllable valve to provide high pressure fuel to said controllable injector during engine start-up.

15. A method of fueling an internal combustion engine, the engine having a combustion chamber for combusting a mixture of gaseous fuel and air, the combustion chamber being coupled to a low pressure fuel source and a high pressure fuel supply, comprising the steps of:

(1) starting the engine with more fuel from the high pressure fuel supply than the low pressure source;

(2) sensing an engine operating characteristic, the operating characteristic being one of engine speed and engine load; and (3) supplying more fuel to the combustion chamber from the low pressure fuel source than the high pressure fuel supply when the engine operating characteristic sensed in step (2) exceeds a predetermined level.

16. The method of claim 15, further comprising the steps of:

(4) establishing a target amount of high pressure fueling relative to low pressure fueling of the combustion chamber;

(5) adjusting fuel flow from the low pressure fuel source in accordance with the target amount established in step (4).

17. The method of claim 15, wherein the high pressure fuel supply includes a storage vessel, and further comprising the steps of:

(4) storing fuel under high pressure in the vessel; and (5) supplying fuel from the vessel during the performance of step (1).

18. The method of claim 15, further comprising the step of adjusting fueling from the high pressure supply to smooth transient operation of the engine.

19. The method of claim 15, further including the step of maintaining air/fuel ratio in the combustion chamber within a predetermined range.

20. The method of claim 15, wherein the high pressure fuel supply includes a storage vessel, and further comprising the steps of:

(4) storing fuel under high pressure in the vessel; and (5) determining an engine transient as a function of the engine operating characteristic sensed in step (2);

(6) providing fuel from the high pressure source to smooth operation of the engine during the transient determined in step (5); and (7) supplying fuel from the vessel during the performance of step (6).

21. A gaseous fueling system for an internal combustion engine, comprising:

a combustion chamber;

a low pressure fuel source coupled to said combustion chamber with a first controllable valve to regulate the flow of low pressure gaseous fuel into said combustion chamber;

a high pressure fuel supply coupled to said combustion chamber with a second controllable valve for regulating the flow of high pressure gaseous fuel into said combustion chamber;

a first sensor providing an engine operation signal corresponding to one of engine speed and engine load;

a controller responsive to said first sensor and coupled to said first and second controllable valves to correspondingly provide a low pressure fueling signal and a high pressure fueling signal in accordance with said engine operation signal; and wherein said first controllable valve responds to said low pressure fueling signal to regulate low pressure fuel flow into said combustion chamber and said second controllable valve responds to said high pressure fueling signal to regulate high pressure fuel flow into said combustion chamber, said low and high pressure fueling signals being configured to provide more high pressure fuel than low pressure fuel when the engine is started and more low pressure fuel than high pressure fuel when said engine operation signal exceeds a predetermined level.

22. The system of claim 21, wherein:

said high pressure fuel supply includes a fuel line coupled to said second controllable valve and a vessel for retaining fuel under high pressure;

said vessel is coupled to said fuel line by a third controllable valve;

said controller is coupled to said third controllable valve and is configured to provide a vessel fueling signal; and said vessel fueling signal actuates said third controllable valve to provide high pressure fuel to said second controllable valve.

23. The system of claim 21, further comprising a second sensor providing an air/fuel ratio signal corresponding to air/fuel ratio of combusted products exhausted from said chamber, said controller being responsive to said second sensor to adjust at least one of said first and second controllable valves as a function of said air fuel ratio signal.

24. The system of claim 21, wherein said high pressure fuel supply is coupled to said low pressure fuel source and includes a compressor for increasing pressure of gaseous fuel received from said low pressure fuel source.

25. The system of claim 24, wherein said high pressure fuel supply includes a fuel line coupled to said second controllable valve and a vessel for retaining fuel under high pressure;

said vessel is coupled to said fuel line by a third controllable valve;

said controller is coupled to said third controllable valve and is configured to provide a vessel fueling signal; and said vessel fueling signal actuates said third controllable valve to provide high pressure fuel to said second controllable valve.

26. A method of fueling an internal combustion engine, the engine having a combustion chamber coupled to a fuel supply passage, the passage being coupled to a low pressure fuel source and a high pressure fuel supply, comprising the steps of:

(1) sensing an engine operation characteristic, the operating characteristics being one of engine speed and engine load;

(2) fueling the combustion chamber through the supply passage, the supply passage receiving fuel from the low pressure fuel source and high pressure fuel supply; and (3) controlling fuel flow from the low pressure fuel source and high pressure fuel supply in step (2) in response to the sensed engine operating characteristics of step (1).

27. The method of claim 26, wherein step (2) further includes the step of providing a mixture of gaseous fuel and air through the supply passage for combustion in the combustion chamber.

28. The method of claim 26, wherein step (2) includes simultaneously supplying fuel to the supply passage from the low pressure fuel source and high pressure fuel supply, and step (3) includes the steps of:

(3a) determining a change in the engine operating characteristic sensed in step (1); and (3b) adjusting fuel flow from the high pressure fuel supply in response to the change determined in step (3a).

29. The method of claim 26, wherein step (3) includes:

(3a) establishing a steady state range of high pressure fueling amount relative to total fueling of the combustion chamber;

(3b) establishing a target operating characteristic, the target operating characteristic being one of engine speed and engine load;

(3c) adjusting fuel flow from the high pressure fuel supply to achieve the target operating characteristic of step (3b); and (3d) adjusting fuel flow from the low pressure fuel source in accordance with the steady state range established in step (3a).

30. The method of claim 29, wherein the target range is about 10% to 20%.

31. The method of claim 26, further comprising the steps of:

(4) starting the engine with more fuel from the high pressure fuel supply than the low pressure source; and (5) supplying more fuel to the combustion chamber from the low pressure fuel source than the high pressure fuel supply when the engine operating characteristic sensed in step (1) exceeds a predetermined level.

32. A gaseous fueling system for an internal combustion engine, comprising:

a combustion chamber;

a fuel supply passage coupled to said combustion chamber to supply a mixture of air and gaseous fuel to said combustion chamber for combustion;

a low pressure air/fuel supply coupled to said passage with a first controllable valve to regulate the flow of low pressure gaseous fuel into said combustion chamber;

a high pressure fuel supply coupled to said passage with a second controllable valve for regulating the flow of high pressure gaseous fuel into said combustion chamber;

a first sensor providing an engine operation signal corresponding to one of engine speed and engine load;

a controller responsive to said first sensor and coupled to said first and second controllable valves to correspondingly provide a low pressure fueling signal and a high pressure fueling signal in accordance with said engine operation signal; and wherein said first controllable valve responds to said low pressure fueling signal to regulate low pressure fuel flow into said passage and said second controllable valve responds to said high pressure fueling signal to regulate high pressure fuel flow into said passage.

33. The system of claim 32, wherein said passage includes an intake port and said second controllable valve includes a fuel injector with an outlet positioned in said intake port.

34. The system of claim 32, further comprising an electric power generator coupled to said engine, said generator being driven by said engine, and said operation signal corresponding to engine load determined as function of power output by said generator.

35. The system of claim 32, further comprising a second sensor providing an air/fuel ratio signal corresponding to air/fuel ratio of combusted products exhausted from said combustion chamber, said controller being responsive to said second sensor to adjust at least one of said first and second controllable valves as a function of said air/fuel ratio signal.

36. The system of claim 32, wherein: said passage includes an air intake to supply a mixture of air and fuel, an intake manifold for distributing the mixture to said engine, and an intake port;

said high pressure fuel supply includes a compressor for increasing pressure of fuel received from said fuel source; and said second controllable valve is a fuel injector with an outlet in said intake port.

37. The system of claim 32, wherein:

said low and high pressure fueling signals are configured to provide more high pressure fuel than low pressure fuel when the engine is started and more low pressure fuel than high pressure fuel when said engine operation signal exceeds a predetermined level;

said high pressure fuel supply includes a high pressure fuel line and a vessel for retaining fuel under high pressure;

said vessel is coupled to said high pressure fuel line by a third controllable valve;

said controller is coupled to said third controllable valve and is configured to provide a vessel fueling signal; and said vessel fueling signal actuates said third controllable valve to provide high pressure fuel to said second controllable valve for engine start-up.

* * * * *